Sept. 6, 1966 R. M. WILSON 3,270,770
FLOAT CONTROLLED VALVE ASSEMBLY

Filed Nov. 29, 1963 2 Sheets-Sheet 1

INVENTOR.
ROBERT M. WILSON
BY Roy A. Plant
ATTORNEY

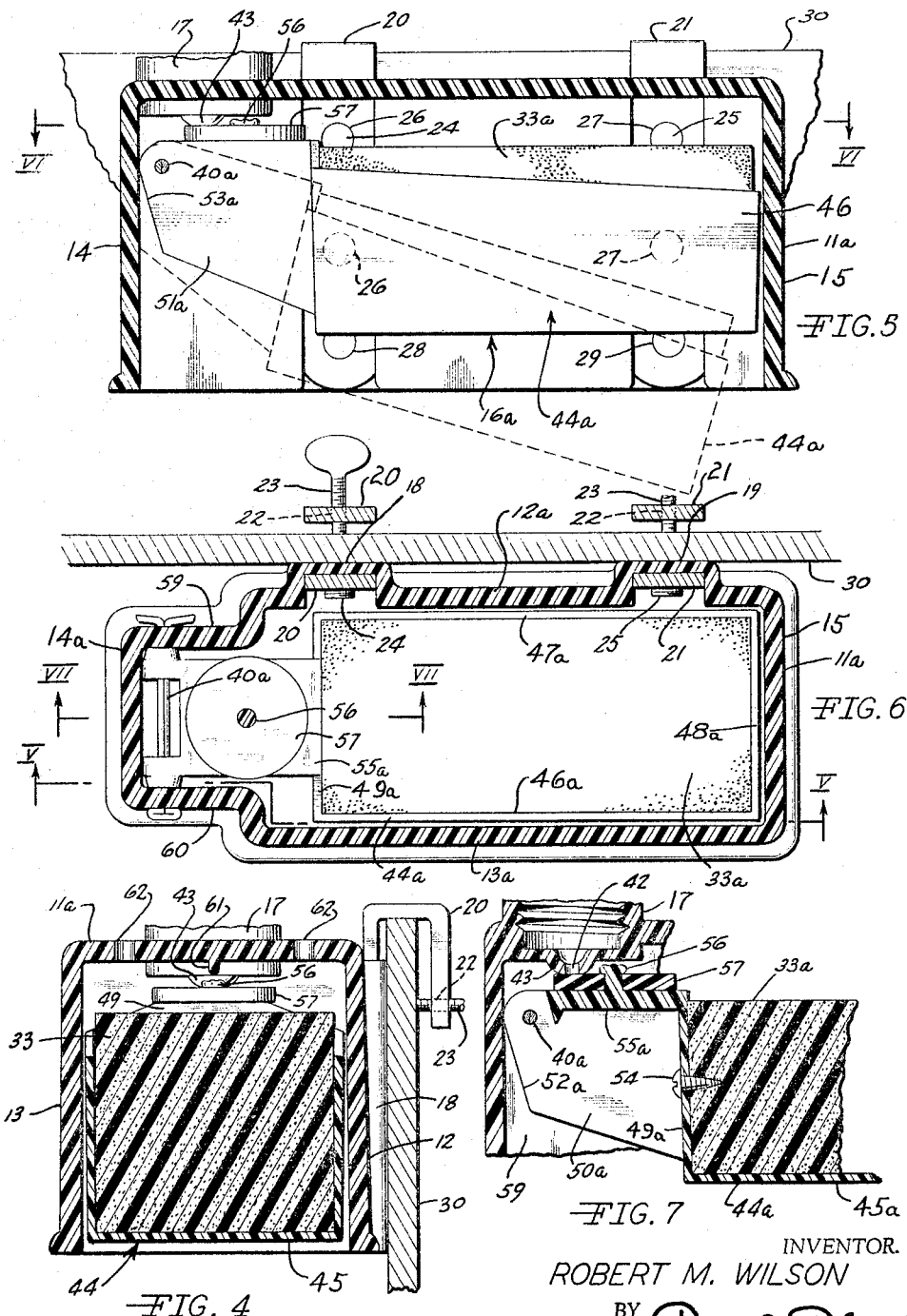

United States Patent Office 3,270,770
Patented Sept. 6, 1966

3,270,770
FLOAT CONTROLLED VALVE ASSEMBLY
Robert M. Wilson, Battle Creek, Mich., assignor to Dare Products, Incorporated, Battle Creek, Mich., a corporation of Michigan
Filed Nov. 29, 1963, Ser. No. 326,787
10 Claims. (Cl. 137—434)

This invention is an improvement on the float valve construction shown in my co-pending patent application Ser. No. 97,314 for a "Float Valve Assembly," filed March 21, 1961, and now Patent No. 3,176,707.

The present invention relates broadly to float valve assemblies, and in its specific phases to an improved float valve assembly adapted for use in stock watering tanks on farms where water under pressure is available.

Float valves of many types have been proposed and used in the past, with the floats in same openly exposed. Such valves with exposed floats would be entirely unsatisfactory for use in a stock watering tank since the inherent curiosity and "nuzzling" of farm animals, such as horses and cattle, would quickly damage the valve mechanism. Some covered mechanisms have been proposed, but generally they are not entirely suitable for use in a stock watering tank due to their inherent cost, non-transferability from tank to tank, complexity, and construction for the use of rigid piping to the water supply. Even with those float valves which have been the best suited for use in stock watering tanks, such as the float valve assembly of my copending application, and which uses a plain "Styrofoam" float within an open bottom cover member, the farm animals have been prone, when the water level in the tank drops, to not only "nuzzle" the valve assembly, but also to lick under the housing and damage the rough surfaced float used in these stock watering tank valve assemblies. It was a recognition of this problem and the need of a still better stock watering tank float valve assembly commercially available on the market which led to the conception and development of the present invention.

Accordingly, among the objects of the present invention is the provision of a float valve assembly particularly adapted for use in stock watering tanks, and wherein licking of the float by the stock has substantially no effect on the operativeness of the valve assembly.

Another object of the present invention is to provide the float valve assembly of a stock watering tank with a float valve having a relatively smooth surface which will withstand normal abuse involved in the stock licking same when the bottom portion of the float is exposed under some conditions.

A further object of this invention is to provide the float valve assembly with a relatively smooth surfaced, pivotally mounted, tray in which the float itself is mounted and anchored.

A further object of this invention is to provide the float valve assembly with a tray having a substantially smooth outer surface and with substantially vertical ears at one end for mounting on a horizontal pivot pin with a valve sealing washer supported horizontally between said ears, said tray having a float member mounted therein and anchored to same for operatively moving said washer to and from sealing position under conditions of use.

Still further objects and advantages of this invention will appear as the description proceeds.

To the accomplishment of the foregoing and related ends, the invention, then, consists of the float valve means hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:
FIGURE 1 is a vertical sectional view of one form of the improved valve assembly of the present invention as taken along line I—I of FIGURE 2, looking in the direction of the arrows.

FIGURE 4 is a sectional view as taken along line IV—IV of FIGURE 1, looking in the direction of the arrows.

FIGURE 5 is a sectional view of a modified construction of the improved valve assembly as taken along line V—V of FIGURE 6, looking in the direction of the arrows.

FIGURE 6 is a sectional view as taken along line VI—VI of FIGURE 5, looking in the direction of the arrows.

FIGURE 7 is a fragmentary sectional view of the hinging and valve sealing members as taken along line VII—VII of FIGURE 6, looking in the direction of the arrows.

Figure 1:
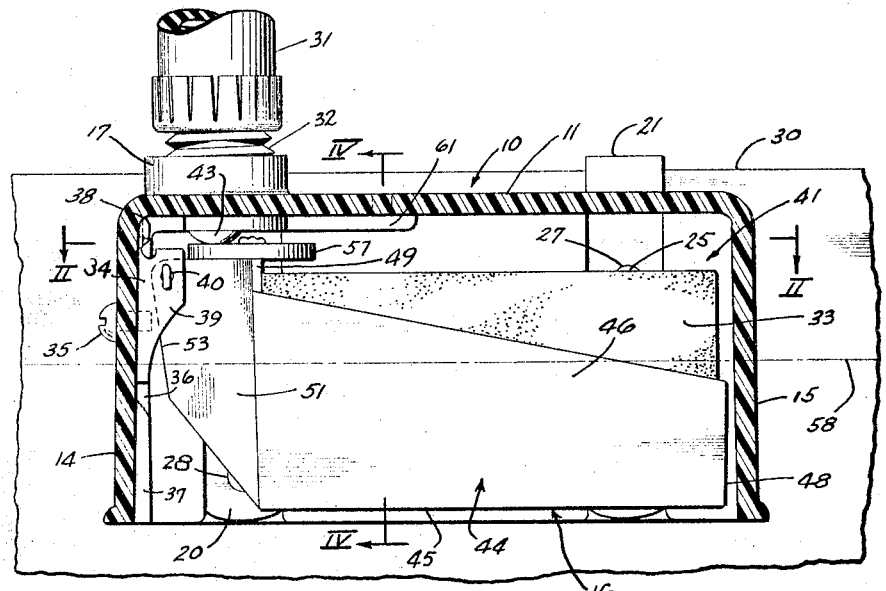

Reference is now made to the drawings in detail wherein there is illustrated in FIGURES 1, 2, 3 and 4, one preferred form of the float valve assembly 10 which has a covered top housing 11, preferably of plastic, with sides 12 and 13, and ends 14 and 15. The bottom of this housing, which is of box-like form, is open for installation and movement of the operating mechanism 16, and the top is provided at one end with a threaded inlet member 17. To stiffen the top of the housing at said inlet member 17, said top is preferably provided with a rib 61, FIGURE 1. Also to facilitate free movement of the float valve subassembly 41 under conditions of use, the top panel is preferably provided with perforations 62. One of the side walls 12 is preferably provided with a pair of outwardly extending, up and down, hollow channels 18 and 19 for the reception of hook-ended supporting members 20 and 21, each of which is preferably provided on its outer ends with a threaded opening 22, FIGURE 4, for the reception of a clamping screw 23. The outwardly extending hollow channels 18 and 19 are cross-drilled at uniform spacings for the reception of screws 24 and 25, while in turn the hook-ended supporting members 20 and 21 are likewise cross-drilled in alinement and threaded at 26 and 27 for the reception of said screws, so that upon tightening the latter the hook-ended supporting members 20 and 21 will be firmly gripped to plastic housing 11 an the outwardly extending hollow channels 18 and 19. The hook-ended supporting members 20 and 21 each preferably has at least one extra threaded hole 28 or 29, respectively in same, FIGURE 5, at the prescribed spacing to facilitate adjustably locating the depth at which the float valve assembly 10 hangs down inside of the stock watering tank wall 30, or the like.

The operating mechanism 16 for these float valve assemblies has to be very sturdy in order to stand the rough usage which is involved when stock has access to the tank while the water supply is slow flowing or cut off through hose 31, the male threaded end 32 of which is screwed into internally threaded inlet member 17 of the plastic housing 11. With the water level in the watering tank dropping under such conditions, the float 33 drops down so as to hang part way out of the bottom of the plastic housing 11, as shown by dashed lines in FIGURE 5, and cattle, or the like, with their rough tongues tend to lick the protruding bottom of the float, which is commonly formed of a cellular plastic material such as "Styrofoam" which has been cut to size from a block of same and is thus rough surfaced. This licking, in a relatively short time, gets the operating mechanism out of order so that the valve portion no longer seals properly and accordingly allows the tank to fill and overflow when the stock is away from the tank for a considerable period of time.

Figure 2:
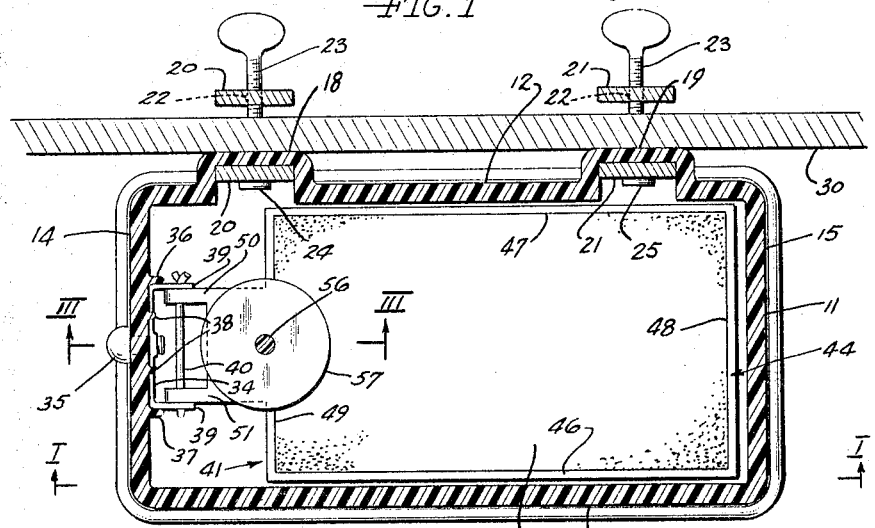
FIGURE 2 is a sectional view as taken along line II—II of FIGURE 1, looking in the direction of the arrows.
Figure 3:
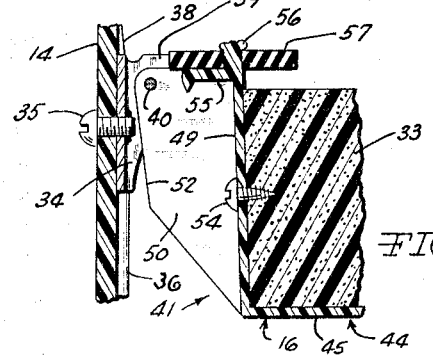
FIGURE 3 is a fragmentary sectional view of the float hinging members as taken along line III—III of FIGURE 2, looking in the direction of the arrows.

Referring more particularly to FIGURES 1, 2 and 3, it will be noted that there is a support member 34 fastened to the inner face of end 14 of housing 11 by means of a screw 35. To facilitate installing support member 34 in the housing, the latter is preferably provided with guiding ribs 36 and 37 and stops 38. Also, the support member 34 is provided with forwardly projecting ears 39 which closely fit the space between ribs 36 and 37 so that when the assembled operating mechanism 16 carrying this support member 34 is slid up into place with the latter between said ribs 36 and 37 and against stops 38, it will be in a position to receive screw 35 which passes through a suitable opening in housing 11 and threadedly engages the support member 34 to anchor same firmly in place.

Pivotally mounted on support member 34 by means of a cotter pin 40, or the like, is the float valve subassembly 41 which will now be described in connection with its operation in sealing the opening or inlet connection 42 in the inlet portion 43, the bottom of which encircles opening 42 and forms the valve seat of the plastic housing 11 or 11a, as shown more particularly in FIGURE 7, so far as the water inlet is concerned. To stiffen the top of housing 11 adjacent the inlet member 17 there is preferably used a reinforcing rib 61, as shown more particularly in FIGURES 1 and 4.

Referring again to FIGURES 1, 2, 3 and 4, it will be noted that there is a tray 44 having a bottom 45, sides 46 and 47, outer end 48, and an inner end 49. This inner end 49 has projecting outwardly from the end of same a pair of ears 50 and 51, with the ends of said ears being perforated for the reception of a pivot member such as cotter pin 40 and spaced apart to stabilize the assembly, as well as to closely but slidably fit between ears 39 of support member 34. The outer ends 52 and 53 of ears 50 and 51 are preferably made to not only provide a rigid support for tray 44, but also to come up against the inner face of end wall 14 of the plastic housing 11 to limit the extent of downward pivotal movement of tray 44 and opening of the valve under conditions of use. This tray 44 has mounted therein float 33 which is preferably formed of bubble-type, polystyrene plastic material, for example "Styrofoam," which cannot become waterlogged and thus forms an ideal float material. This float 33 preferably forms a rather close fit between the side and end walls of the tray 44 and is firmly anchored therein by cementing and/or anchoring with a screw 54.

The top of end wall 49 of tray 44 and the top of ears 50 and 51 are preferably provided with a web or top panel 55 joining same, FIGURE 3, and with a post member 56 which is preferably round in cross section and extends upward substantially midway between ears 50 and 51 and at the inner end wall 49 of said tray. Mounted on this post is a resilient washer 57 which is preferably made of firm but readily compressible natural or ynthetic rubber. This washer is frictionally held on post 56 so as to normally stay in fixed position unless forcibly rotated for a purpose to be hereinafter set forth. While post 56 can be in the form of a metal rivet, same is preferably made of a thermoplastic substance, the same as tray 44 so that by applying a suitable amount of heat to the end of this post 56, which extends above resilient washer 57, same will soften and flatten out sufficiently to form a head which, when cold, will hold resilient washer 57 tightly but rotatably in place under conditions of use of the float valve assembly. This supported washer, as more particularly shown in FIGURE 1, has the end portion of same adjacent the end wall 14 of plastic housing 11 come under water inlet portion 43, in the same manner as illustrated in the modified construction of FIGURE 7. It is thus to be seen that as the water level 58, FIGURE 1, rises its effect on float 33 in tray 44 is to swing that float upward about cotter pin 40 as a hinge point, and the higher the float rises the more pressure it will exert between resilient washer 57 and the valve seat end of water inlet portion 43 of the plastic housing 11. When this pressure equals the pressure of the water exerted through opening 42 in the inlet portion 43, it shuts off the water flow from hose 31 into the watering tank.

After normal long use of the float valve assembly, and the scouring action of the water on washer 57, it may be desirable to remove screw 35, after shutting off the water being delivered through hose 31, and slide the operating mechanism 16 out of the bottom of plastic housing 11. It is then a simple matter to rotate resilient washer 57 enough on post member 56 to provide a fresh area to bear against the valve seat of inlet portion 43 of plastic housing 11, which thus places the operating mechanism 16 in condition to be replaced in plastic housing 11 as before, and tighten screw 35 to anchor the operating mechanism 16 in operating position once more.

Now referring to the alternate construction, as shown in FIGURES 5, 6 and 7, it will be noted that the plastic housing 11a has its side panels 12a and 13a provided with inward offset portions 59 and 60 at one end and perforated for the reception of a pivot member such as a cotter pin 40a, or the like, on which tray 44a can be pivotally mounted as shown. Here the ears 50a and 51a are a little longer than the corresponding ears shown in FIGURES 1, 2 and 3, and it is also to be noted that the outer end 53a of ears 50a and 51a function in identical manner to the outer end previously described in connection with the construction illustrated in FIGURES 1 and 3. The tray 44a likewise functions in identical manner to the tray 44 and has a float 33a mounted therein in the same manner as previously described. The resilient washer 57 is mounted on the top of web or top panel 55a in the same manner as previously described by means of rivet or post member 56. The modified construction, accordingly, by having offset portions 59 and 60 of the side panels 12a and 13a of the plastic housing 11a avoids the need of a support member 34 with screw 35 and guiding ribs 36 and 37, as well as stops 38. It is thus to be seen that the alternate construction shown in FIGURES 5, 6 and 7 has identically the same operative functions as the construction shown in FIGURES 1, 2, 3 and 4, but varies in the way that the operating mechanism 16a is pivotally mounted on the housing.

From the foregoing, it will be seen that novel and advantageous provisions has been made for carrying out the desired ends relative to a float valve assembly especially adapted for use in watering tanks for stock and the like. However, attention is directed to the fact that equivalent variations may be made in the float valve assemblies described herein, such as using a metal housing, as well as a different form of non-waterloggable float, without departing from the spirit and scope of the invention, as herein illustrated and described. Directional terms, such as "up," "down," "bottom," "top," vertical," "horizontal," "upward," et cetera, have also been used to facilitate describing the float valve assemblies in the positions shown in the drawing, and accordingly are not to be considered as limiting upon the invention.

Other modes of applying the principle of my invention may be employed instead of those explained, change being made as regards the apparatus herein disclosed, provided the means stated by any of the following claims or the equivalent of such stated means be employed.

I therefore particularly point out and distinctly claimed as my invention:

1. A float valve assembly for watering tanks and the like, comprising a box-like member having a top, sides, ends, and an exposed open bottom, with the upper portion of said box-like member being vented, said box-like member having an inlet connection into same through said top adjacent but spaced from one end of same, said inlet connection being connectable to one end of a supply line for liquid under pressure, a valve seat encircling the other end of said inlet connection inside of said box-like member, pivot means at the end of and inside said box-like member adjacent said inlet connection, a sealing valve member for sealing on said valve seat, means pivotally mounted on said pivot means at the end of said box-like member, means for mounting said sealing valve member in fixed position on said pivotally mounted means for movement in unison with same to and from said valve seat, a float, and means for mounting and supporting said float on said pivotally mounted means wholly within said box-like member, the portion of said float supporting means adjacent the open bottom of said box-like member serving as a shield for said float and having a smooth outer surface.

2. A float valve assembly for watering tanks and the like as set forth in claim 1, wherein said pivot means at the end of and inside said box-like member is in the form of a pivot pin, and means on the sides of said box-like member for supporting the ends of said pivot pin.

3. A float valve assembly for watering tanks and the like as set forth in claim 1, wherein said pivot means at the end of and inside said box-like member comprises a pivot pin, a support member on which said pin is mounted, and means for fastening said support member on the inner side of said end wall of said box-like member adjacent said inlet connection.

4. A float valve assembly for watering tanks and the like as set forth in claim 3, wherein said inner side of said end wall of said box-like member has guide and stop means for locating said support member in operating position, and means for releasably anchoring said support means in said operating position.

5. In a float valve assembly of the character described for use in stock watering tanks and the like, the combination which includes a box-like member having a top, sides, ends and an open bottom, an inlet connection into said box-like member through said top adjacent one end of same, a float, a tray carrying said float within said box-like member and shielding the underface of same, means pivotally mounting said tray on the end of said box-like member wholly within same and adjacent said inlet connection for pivotal movement to and from said top, and means closing said inlet connection when said tray carrying said float is in its uppermost position.

6. A float valve assembly for watering tanks and the like, which comprises a vented float housing which has a top, ends, and sides, and an open bottom, said housing having an inlet connection into same through said top adjacent one end of same, means for connecting said inlet connection to a suitable source of liquid under pressure, a valve seat on the inner face of said top and closely encircling said inlet, pivot means inside of and supported on said housing at the end of same adjacent said inlet connection, a float means pivotally supported on said pivot means, said float means including a tray having a relatively smooth bottom, a float mounted in said tray, above said bottom, means for anchoring said float in said tray, and a sealing valve member carried by and fastened to said float means adjacent the pivoted end of same to move in unison with and in the same direction as said float means and in position to seal on said valve seat and stop liquid flow through said inlet when said float means is in its uppermost position and to clear said valve seat for liquid flow through said inlet when said float means is retracted from its uppermost position.

7. A float valve assembly for watering tanks and the like as set forth in claim 6, wherein said pivot means at the end of and inside said box-like member is in the form of a pivot pin, and means on the sides of said box-like member for supporting the ends of said pivot pin.

8. A float valve assembly for watering tanks and the like as set forth in claim 6, wherein said pivot means at the end of and inside said box-like member comprises a pivot pin, a support member on which said pin is mounted, and means for fastening said support member on the inner face of the end wall of said box-like member adjacent said inlet connection.

9. A float valve assembly for watering tanks and the like as set forth in claim 8, wherein the inner face of said end wall of said box-like member has guide and stop means for locating said support member in operating position, and means for releasably anchoring said support means in said operating position.

10. A float valve assembly for watering tanks and the like, which comprises a vented float housing which has a top, ends, sides, and an open bottom, said housing having an inlet connection into same through said top adjacent but spaced from one end of same, means for connecting said inlet connection to a suitable source of liquid under pressure, the flow of which into said tank is to be controlled by the float valve assembly, a valve seat on the inner face of said top and substantially including and encircling the inner edge of said inlet, pivot means inside of and supported on said housing at the end of same adjacent said inlet connection, a float means pivotally supported on said pivot means, said float means including a tray having sides, ends, and a relatively smooth bottom, a float mounted in said tray, means for anchoring said float in said tray, said tray having on one end thereof a pair of extending ears carrying the pivots which pivotally mount said float means on said pivot means supported by said housing, a web joining the tops of said ears, a round cross section post mounted on and extending upward from said web, and a sealing valve member mounted on and rotatable about said post and supported flat on said web adjacent the pivoted end of said float means in position to seal on said valve seat and stop liquid flow through said inlet when said float means is in its uppermost position and to clear said valve seat for liquid flow through said inlet into said tank when said float means is retracted from its uppermost position.

References Cited by the Examiner

UNITED STATES PATENTS

| | | | |
|---|---|---|---|
| 1,193,683 | 8/1916 | Glanz | 119—80 |
| 1,864,443 | 6/1932 | Khun | 137—448 X |
| 2,831,497 | 4/1958 | Skerritt | 137—436 |
| 2,842,158 | 7/1958 | Robinson | 137—428 |
| 3,067,879 | 12/1962 | Baker | 137—448 X |

WILLIAM F. O'DEA, *Primary Examiner.*

ISADOR WEIL, *Examiner.*

D. MATTHEWS, *Assistant Examiner.*